US010648659B2

(12) United States Patent
Jönsson et al.

(10) Patent No.: US 10,648,659 B2
(45) Date of Patent: May 12, 2020

(54) STATUS LIGHT ASSEMBLY FOR PATIENT HANDLING EQUIPMENT

(71) Applicant: ArjoHuntleigh AB, Malmo (SE)

(72) Inventors: Jörgen Jönsson, Harlosa (SE); Musadjan Alim, Lund (SE); Danny Smith, Lund (SE)

(73) Assignee: ArjoHuntleigh AB, Malmo (SE)

(*) Notice: Subject to any disclaimer, the term of this patent is extended or adjusted under 35 U.S.C. 154(b) by 0 days.

(21) Appl. No.: 15/754,735

(22) PCT Filed: Aug. 25, 2016

(86) PCT No.: PCT/EP2016/070126
§ 371 (c)(1),
(2) Date: Feb. 23, 2018

(87) PCT Pub. No.: WO2017/032851
PCT Pub. Date: Mar. 2, 2017

(65) Prior Publication Data

US 2019/0024882 A1 Jan. 24, 2019

(30) Foreign Application Priority Data

Aug. 25, 2015 (EP) .................................... 15182287

(51) Int. Cl.
*B60Q 1/26* (2006.01)
*F21V 33/00* (2006.01)
(Continued)

(52) U.S. Cl.
CPC ............ *F21V 33/0072* (2013.01); *A61G 5/04* (2013.01); *A61G 5/10* (2013.01); *A61G 7/05* (2013.01);
(Continued)

(58) Field of Classification Search
CPC ........ A61G 5/128; A61G 5/10; A61G 5/1089; A61G 5/1059; A61G 5/047; A61G 5/1051;
(Continued)

(56) References Cited

U.S. PATENT DOCUMENTS 6,209,670 B1 * 4/2001 Fernie .................... A61G 5/043 180/11
8,573,777 B1 * 11/2013 Kendrick ............. A61B 3/0075 351/214
(Continued)

FOREIGN PATENT DOCUMENTS

EP 2695592 A2 2/2014
EP 2777670 A1 9/2014
(Continued)

*Primary Examiner* — Daniel Previl
(74) *Attorney, Agent, or Firm* — The Webb Law Firm

(57) ABSTRACT

Patient handling equipment, such as a hospital bed, is provided with a propulsion system and a status indicator light system incorporated in the propulsion system and operable to generate at least two light beams beyond a perimeter of the bed. The light indicator, which may have different colors, shapes or intensities, can indicate the state of propulsion of the system and generates light beams which are visible all around the equipment so as to be visible to a carer from any angle. The apparatus may include an ambient light sensor disposed to detect floor level lighting conditions rather than general ambient light.

29 Claims, 4 Drawing Sheets

(51) Int. Cl.

| | |
|---|---|
| ***A61G 5/04*** | (2013.01) |
| ***A61G 7/08*** | (2006.01) |
| ***A61G 13/10*** | (2006.01) |
| ***A61G 7/05*** | (2006.01) |
| ***A61G 5/10*** | (2006.01) |
| *F21V 23/00* | (2015.01) |
| *F21V 23/04* | (2006.01) |
| *F21W 111/00* | (2006.01) |

(52) U.S. Cl.

CPC ............. *A61G 7/08* (2013.01); *A61G 13/104* (2013.01); *A61G 2203/30* (2013.01); *A61G 2203/72* (2013.01); *F21V 23/003* (2013.01); *F21V 23/0464* (2013.01); *F21W 2111/00* (2013.01)

(58) Field of Classification Search

CPC ...... A61G 2203/14; A61G 5/045; A61G 5/08; A61G 5/1054; A61G 5/14; A61G 2200/56; A61G 5/00; A61G 5/02; A61G 5/026; A61G 5/04; A61G 5/043; A61G 5/1035; A61G 5/1075; A61G 5/127; A61G 5/085; A61G 5/0891; A61G 5/1078; A61G 5/1097; A61G 5/12; A61G 2200/36; A61G 5/023; A61G 5/025; A61G 5/06; A61G 5/061; A61G 5/065; A61G 5/1094; A61G 1/0268; A61G 1/0281; A61G 2200/34; A61G 2200/52; A61G 2203/723; A61G 3/063; A61G 5/021; A61G 5/042; A61G 5/0825; A61G 5/0875; A61G 5/1024; A61G 5/1072; A61G 7/1017; A61G 7/1046; A61G 7/1051; A61G 7/1094; A61G 7/1096; B25J 9/1697; B25J 11/009; B25J 5/005; B25J 19/023; G05D 1/0246; G05D 1/0276; G05D 2201/0206; G05D 1/0016; G05D 1/0094; G05D 1/0242; G05D 1/0257; G05D 1/0011; G05D 1/0088; G05D 1/021; G05D 1/0225; G05D 1/0231; G05D 2201/0208; G05D 1/0891; Y10S 297/04; Y10S 180/907; Y10S 297/10; Y10S 414/134; B62D 57/024; B60R 16/0215; A01D 2101/00; A01D 34/008; A01D 34/63; A01D 43/14; A01M 17/00; A01M 21/043; A01M 7/0089; B05B 12/122; B62M 1/14; B62M 1/36; B64C 2201/027; B64C 2201/108; B64C 2201/127; B64C 3/00; B64C 5/02; B64C 5/10; B64C 9/16; G06K 9/00; G06K 9/00791; G06K 9/6201; G06K 9/6202; G06Q 10/083; H04N 7/181; A61H 2003/001; A61H 2201/1633; A61H 3/04; B60L 13/006; B60L 15/2036; B60L 2200/34; B60L 2220/46; B60L 2240/12; B60L 2240/16; B60L 2240/20; B60L 2240/32; B60L 2240/421; B60L 2240/423; B60L 2240/461; B60L 2240/465; B60L 2250/24; B60L 3/106; B60L 50/51; B61B 13/04; B61B 3/00; B61B 3/02; B61B 5/00; B61C 13/04; B61L 3/10; B65G 17/36; B65G 63/004; B66C 23/48; H04B 1/44; H04B 3/544; Y02T 10/645; Y02T 10/7005; Y02T 10/72; Y02T 10/7275; Y02T 30/10; Y02T 30/30; Y02T 30/40; Y10T 74/20492

USPC ............... 340/463, 465, 459, 467, 468, 525, 340/539.12, 539.22, 555–557, 641

See application file for complete search history.

(56) References Cited

U.S. PATENT DOCUMENTS

| | | | | |
|---|---|---|---|---|
| 2003/0159861 | A1 | 8/2003 | Hopper et al. | |
| 2007/0080003 | A1 | 4/2007 | Koerlin et al. | |
| 2007/0089238 | A1 * | 4/2007 | Kramer .................. | A61G 7/015 5/618 |
| 2009/0138122 | A1 * | 5/2009 | Wagner ................ | A61G 12/001 700/226 |
| 2010/0126789 | A1 * | 5/2010 | Scragg ..................... | B62K 5/01 180/208 |
| 2010/0283590 | A1 * | 11/2010 | Tee ........................ | A42B 3/044 340/432 |
| 2013/0162396 | A1 * | 6/2013 | Yang ....................... | B60L 15/20 340/5.81 |
| 2014/0262575 | A1 | 9/2014 | Richter | |
| 2014/0313761 | A1 * | 10/2014 | Nelson-Herron ....... | G09F 17/00 362/523 |

FOREIGN PATENT DOCUMENTS

| | | | |
|---|---|---|---|
| WO | 9705844 | A1 | 2/1997 |
| WO | 2013053040 | A1 | 4/2013 |
| WO | 2015021950 | A1 | 2/2015 |

* cited by examiner

STATUS LIGHT ASSEMBLY FOR PATIENT HANDLING EQUIPMENT

CROSS-REFERENCE TO RELATED APPLICATIONS

This application is the United States national phase of International Application No. PCT/EP2016/070126 filed Aug. 25, 2016, and claims priority to EP Application No. 15182287.1, filed on Aug. 25, 2015; the disclosures of which are hereby incorporated in their entirety by reference.

BACKGROUND OF THE INVENTION

Field of the Invention

The present disclosure relates to a status light for patient handling equipment such as medical beds, trolleys or patient lifters having propulsion assistance.

Description of Related Art

Propulsion systems for patient handling equipment with complicated user interfaces and/or poor user feedback indicators may pose a safety concerns. For example, fixed handle control systems that require multiple user inputs and constant monitoring of the controls may restrict the user's freedom in maneuvering and/or detract the user's attention from driving or otherwise operating the patient handling equipment. Additionally, systems with a lack of adequate and/or noticeable user feedback signals may result in mistaken assumptions as to the position of a drive wheel and/or operational state of the propulsion system. Furthermore, systems which require a user to assume awkward positions to observe a feedback signal dissuade use of such safety features. It is therefore beneficial to design user interfaces that are intuitive, easy to operate and provide clear user feedback signals to facilitate and ensure safe operation.

For the above reasons, there is a need to design user interface and feedback systems that can clearly and easily notify a user as to the operational status of a propulsion system and/or position of a drive wheel for a patient handling equipment. For patient handling equipment without fixed controls and allow for user engagement/direction at multiple points along its body, it may further be useful to provide user feedback indicators that are not positionally restricted. For example, it may be beneficial to provide a strategically positioned lights or other visual indicators, visible to a user from various locations around the patient handling equipment which does not require a user be in a given position to be observed.

SUMMARY OF THE INVENTION

The present application seeks to provide an improved status indicator system for patient handling equipment. Exemplary embodiments provide a projected light indicator for user feedback which does not restrict the user to a narrowly defined place in order to see the status light.

According to one exemplary embodiment, there is provided a patient handling equipment including a chassis, a plurality of wheels coupled to the chassis, a propulsion system coupled to at least one of the wheels, and a status light indicator device coupled to the chassis; wherein the equipment has a lateral perimeter, the status light indicator device being disposed within the lateral perimeter of the device and arranged to generate at least one status light beam extending downwardly and outwardly beyond the perimeter.

According to another exemplary embodiment, a patient handling equipment may include a chassis, a plurality of wheels coupled to the chassis, a propulsion system for driving the patient handling equipment, and a status light indicator device operatively associated with the propulsion system and generating light to provide an indicator as to a state of the propulsion system or component thereof.

According to another exemplary embodiment, a patient handling equipment may include a chassis, a plurality of wheels coupled to the chassis, a propulsion system for driving the patient handling equipment, and a status light indicator device operatively associated with the propulsion system, wherein the status light indicator device is mounted to a lower surface of the chassis adjacent to the propulsion system, a lower surface of the patient handling equipment adjacent to the propulsion system or directly mounted to the propulsion system.

According to another embodiment, a patient handling equipment may include a chassis, a plurality of wheels coupled to the chassis, a propulsion system for driving the patient handling equipment, an ambient light sensor, and a status light indicator device operatively associated with the propulsion system and the ambient light sensor, wherein the status light indicator device adjusts an intensity of light generated by the status light indicator device based on detected ambient light intensity.

The patient handling equipment may have a status light indicator device that generates light to provide an indication as to a position of a drive wheel of the patient handling equipment. The status light indicator device may generate at least one light beam directed downwardly and outwardly with respect to a lower surface of the patient handling equipment and is visible irrespective of a viewer's position about the patient handling equipment. The status light indicator device may be disposed within a lateral perimeter of the patient handling equipment and arranged to generate at least one light beam that extends downwardly and outwardly beyond the lateral perimeter. At least one light beam generated by the status light indicator device may extends outwards about 2 inches to about 4 inches from a lateral perimeter of the patient handling equipment. At least one light beam generated by the status light indicator device may extends outwards at least about 2 inches from a lateral perimeter of the patient handling equipment.

The generated status light beam or beams will be visible around the equipment and in practice form a plurality of directions, thereby giving a greater range of viewing locations relative to prior art arrangements.

In the exemplary embodiment, the status light indicator device includes at least two light projecting elements operable to generate at least two status light beams extending downwardly and outwardly beyond the perimeter and in different directions relative to one another. In one embodiment, at least two projecting elements are operable to generate light beams in opposing directions relative to one another. They may extend beyond a side of the chassis and in some embodiments substantially perpendicularly relative to the or a respective side of the chassis.

In this manner, in an exemplary embodiment, light signals projected by the status light beams can be seen from any point around the chassis and perimeter of the equipment. The status light indicator device may be operable to generate one or more light beams of different colours, for example blue or purple light beams. These differ from commonly used status light indicators and will therefore provide equipment specific indicators.

In some embodiments, the status light indicator device is operable to generate one or more light beams of different shapes and/or one or more light beams of different light patterns, such as intermittent or continuous.

In one embodiment, the status light indicator device is disposed adjacent or incorporated with the propulsion system.

The or each status light beam may be visible from a side of the chassis other than the or a side from which the status light beam extends.

In one embodiment, the equipment includes a control unit coupled to the status light indicator device and to one or more equipment sensors. The control unit may be coupled to a motor of the propulsion system and operable to generate a status light command to the status light indicator device when the motor of the propulsion system is operational. The control unit may be operable to generate a status light command dependent upon sensed motor speed.

In some embodiments at least, the control unit is coupled to at least one driven wheel and is operable to generate a status light command to the status light indicator device when the at least one driven wheel is in an engaged position. Similarly, the control unit may be coupled to an accelerometer and is operable to generate a status light command to the status light indicator device when it is detected that the equipment is moving or accelerating. The control unit may be operable to generate a status light command differing in dependence upon detected equipment speed.

Advantageously, the control unit is coupled to a patient detection element and is operable to generate a status light command to the status light indicator device when it is detected that a patient is occupying the equipment.

The control unit may be operable to generate a status light command to the status light indicator device indicative of at least one of: light status, light colour, light intensity and light beam shape.

Advantageously, there is provided an ambient light sensor, coupled to the control unit, the control unit being operable to adjust the operation of the status light indicator device on the basis of the detected ambient light. In one embodiment, the ambient light sensor is disposed to detect floor level light, such as floor level light outside the lateral perimeter of the equipment.

By having a light signal projected onto a surface such as the flooring, the status indication can be projected onto a bigger area than would have been possible with the same light source placed in a traditional control display panel. If the light source and projection optics are placed together with propulsion assisting electronics and mechanics of the equipment, additional cabling, cable glands, supporting brackets, and so on, can be avoided. This can provide a cost effective solution together with the benefits of an easier to clean product, which would be superior to the current propulsion assisted equipment on the market.

The exemplary embodiments can provide a common user feedback system consistent over several types of wheeled patient handling equipment, such as trolleys, beds, active lifters, passive lifters, and can also be used with other wheeled equipment in the healthcare sector, such as linen carts, food carts and so on. The common factor would be a projected light stretching outside the perimeter of the equipment, making the signal visible to the user regardless of which side of the equipment the user is standing. The light may be projected onto the flooring with a distinctive colour, shape, pattern, or combination of these, indicating the status of the propulsion system, and may be consistent among different products equipped with the same type of propulsion system module.

Projected light indicators onto the flooring have been used on medical beds as a means of signaling the status of the bed, such as if the side rails are up, if the wheels locked and so on. Under bed lights have also been used for enhancing the visibility of the floor surface in order to provide safer bed access in dark environments. However, no propelled patient handling equipment has been provided with user feedback system in the form of a projected light in order to indicate the status of the propulsion system, such as "ready to use", "battery low" and so on.

What has been used to date for user feedback in propulsion systems of patient handling equipment provides a panel feedback light indication, such as an LED at the operating handle or an LCD screen at a given location of the equipment. However, such arrangements restrict the user to a defined location relative to the equipment in order for to see the visible status signal.

The present disclosure seeks to improve the visibility of the propulsion system status indication, allowing the user to move freely around the patient handling equipment and still be able to see the generated status indication.

The present disclosure also seeks to minimize the cost of such a system by having the light source/s placed in an optimal position with regard to cable management, mounting and cleaning, may be integrated in the propulsion system unit, projecting the light onto the flooring outside the perimeter of the equipment by means of light collecting optics and mounting angle adapted to the geometry of the equipment.

The present disclosure also seeks to provide a system that adapts the intensity of the light indicator to ambient light around the patient handling equipment in to be visible in bright environments yet comfortable, that is not dazzle the user in dark environments.

In one exemplary embodiment, the present disclosure is also directed to a method for using a patient handling equipment including a propulsion system for driving the patient handling equipment and a status light indicator device operatively associated with the propulsion system. The method involves the step of generating light from the status light indicator device to indicate a state of the propulsion system or component thereof.

In another exemplary embodiment, the present disclosure is directed to a method for using the patient handling equipment of any one of the above described embodiments, wherein the method involves the step of generating light from the status light indicator device to indicate a state of the propulsion system or component thereof.

In an exemplary embodiment, the method may involve generating fight from the status light indicator device to provide an indication as to a position of a drive wheel of the patient handling equipment. The method may also involve using status light indicator device to generate at least one light beam that extends downwardly and outwardly with respect to a lower surface of the patient handling equipment and is visible irrespective of a viewer's position about the patient handling equipment. In yet another embodiment, the method may involve using the status light indicator device to generate at least one light beam that extends downwardly and outwardly beyond the lateral perimeter of the patient handling equipment and reflects upwardly from a surface supporting the patient handling equipment. In another embodiment, the method may involve using a status light indicator device to generate at least one light beam that extends outwardly about 2 inches to about 4 inches from a lateral perimeter of the patient handling equipment. In an exemplary embodiment the method may involve using at least one light beam generated by the status light indicator device as a reference point to guide a user in maneuvering the patient handling equipment. In another embodiment, the method may comprise detecting ambient light adjacent to the patient handling equipment and adjusting an intensity of light generated by the status light indicator device based on the detected ambient light intensity. In yet another embodiment, the method may involve using status light indicator device to generate at lights of different colors and/or flashing patterns to indicate different positions of the drive wheel, states of the propulsion system or its components and/or system errors.

BRIEF DESCRIPTION OF THE DRAWINGS

Embodiments of the present disclosure are described below, by way of example only, with reference to the accompanying drawings, in which.

DESCRIPTION OF THE INVENTION

Figure 1:
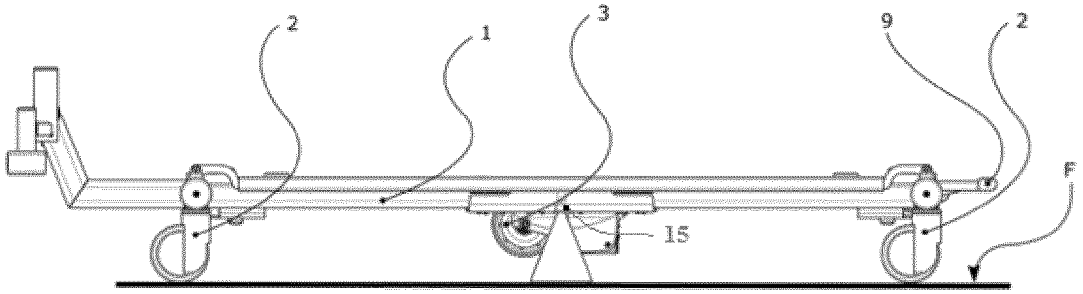
FIG. 1 is a side elevational view of one embodiment of a patient bed provided with an exemplary illuminated propulsion system status indicator as taught herein.

Referring first to FIG. 1, a mobile patient handling equipment such as, by way of example a bed or a stretcher, includes a chassis 1 connected to a plurality of castors 2, at least three to make for a stable design but most commonly four. The castors 2 make ground contact with a support surface, such as the floor F. The chassis typically supports additional elements, including other components of the equipment such as a mattress or other patient support, patient holders, receptors, and so on, as well as the payload itself, in this case the patient.

The chassis may include a propulsion system 4 which comprises at least one motor driven wheel 3 in contact with the floor F. The engagement and disengagement of the drive wheel 3 can be realized in numerous ways, here exemplified by a foot pedal 9 operable by the user. For example, in one exemplary embodiment the user may: (1) raise foot pedal 9 to place the drive wheel 3 in an engaged state to apply the chassis propulsion assistance, that is to cause the motor driven wheel 3 to lower and engage the flooring F, or (2) lower foot pedal 9 to set the motor driven wheel 3 to a raised and/or mid position by disengaging the motor driven wheel 3 from the floor F. In one embodiment, lowering foot pedal 9 may be configured as a brake pedal and also functions to brake the load bearing castors 2 when lowered by a user. In another embodiment, raising foot pedal 9 may place drive wheel 3 in an engaged state with floor F while lowering foot pedal 9 may place drive wheel 3 in a disengaged state.

Figure 2:
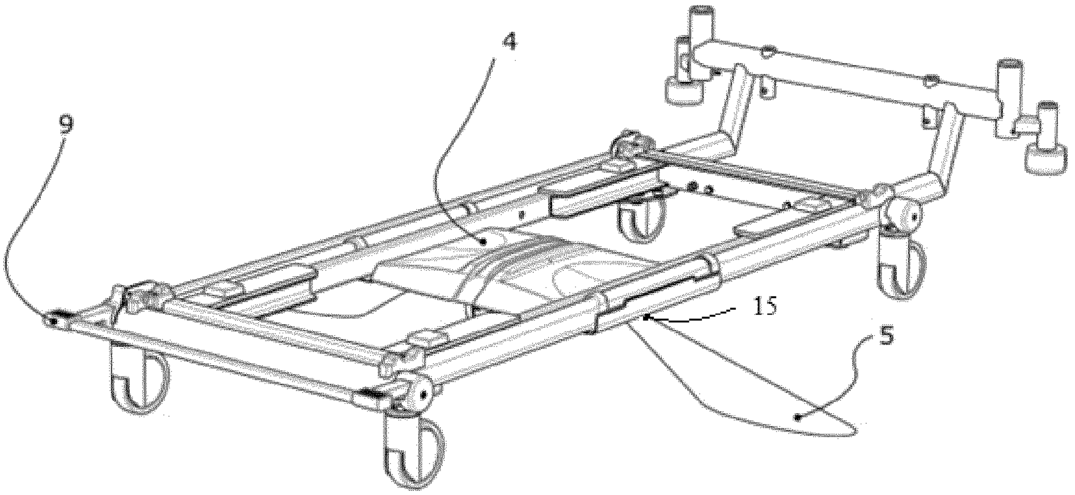
FIG. 2 is a perspective view of the bed of FIG. 1.

Referring now to FIG. 2, an exemplary propulsion system 4 is shown as a self-containing unit incorporating all the primary components of such a system, such as one or more batteries, electronics, cabling, sensors, motor driven wheel 3, wheel suspension and so on. The propulsion system 4 can be rigidly or semi-rigidly connected to the chassis 1.

To provide clear, convenient and confirmatory feedback to the user regarding the brake status of the patient handling equipment and/or the state or operating condition of the propulsion system 4 and components thereof, e.g. such as the position of the drive wheel 3/whether drive wheel 3 is engaged or disengaged with the floor F and/or whether or not the motor that propels the wheel 3 is engaged, a user feedback system/status indicator assembly 15 is operatively associated with propulsion system 4 and/or components thereof, such as drive wheel 3.

Different ways of providing user feedback signals regarding the brake status of the patient handling equipment and/or the operating status of the propulsion system 4 may include sound, e.g. in the form of the mechanics or motors themselves as they operate and/or with buzzers, loudspeakers or similar, or by means of vibrations from the mechanics or motors themselves as they operate and/or with dedicated vibration modules, such as a coil and plunger, off-centre ballast coupled to a rotary motor. Yet another way of providing feedback is by means of visible light, such as by means of a display capable of showing static or dynamic graphics, which may be a touch screen also used for inputting commands, the display being mounted on the patient handling equipment or by a wireless connection allowing it to be remote from the equipment.

Other ways of providing visible feed-back could by means of a light such as a light emitting diode positioned to be visible from all sides or at least from most points about the patient handling equipment at which a user operates the equipment. An exemplary embodiment in which the light is projected onto the floor F is shown by the light beam 5 in FIGS. 2-3.

Figure 3:
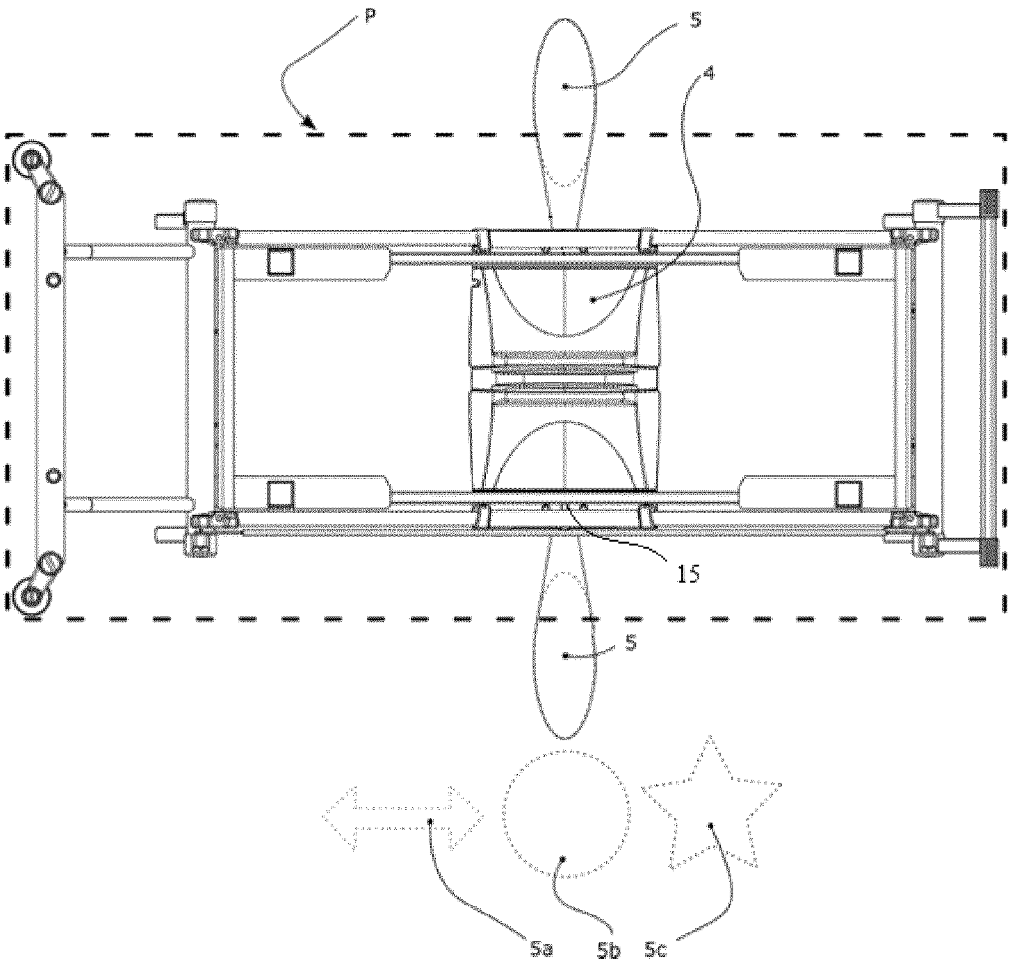
FIG. 3 is a plan view of the bed of FIG. 1.

FIG. 3 illustrates the perimeter of the mobile patient handling equipment, as seen from above, is indicated by a region P. A user will for most of the time be outside this area and in normal circumstances will be able to see the flooring outside this area as the user moves around the equipment. The perimeter P preferably denotes the zone around the components at the widest and longest locations of the equipment.

The propulsion system 4 is disposed within the perimeter P and an exemplary illuminated user feedback system/status indicator assembly 15 can be configured to provide illumination outside the area P, as illustrated in FIG. 3 by a light beam 5 projected downward and outward from a lower surface of the patient handling equipment onto the floor F, forming an ellipse that may be reflected upwards allowing for clear visibility by a user. The status indicator assembly 15 may also project other light beam shapes, by appropriate design of the optics, shape forming elements in the optics arrangement, of a nature which will be apparent to the skilled person. Examples of other shapes of projected light beam are shown as 5*a*, 5*b* and 5*c* in FIG. 3.

In the exemplary illustration of FIG. 3, the projected light beam 5 is substantially perpendicular to the side of the chassis 1. In other embodiments, light beam 5 may be projected in other directions, that is at other angles relative to a side of the patient handling equipment, such that the light beam as projected onto the flooring F will be closer to the corners of the chassis. Similarly, the number of projecting lights can be varied. In FIG. 3 two light beams are shown. In other embodiments there may be just one or multiple light beams 5 projecting from a single or multiple lighting units 16 of the status indicator assembly 15. In an exemplary embodiment, there are at least two light beams 5 projected downward and laterally outwards from the two lateral sides of the chassis 1 and patient handling equipment.

Figure 7:
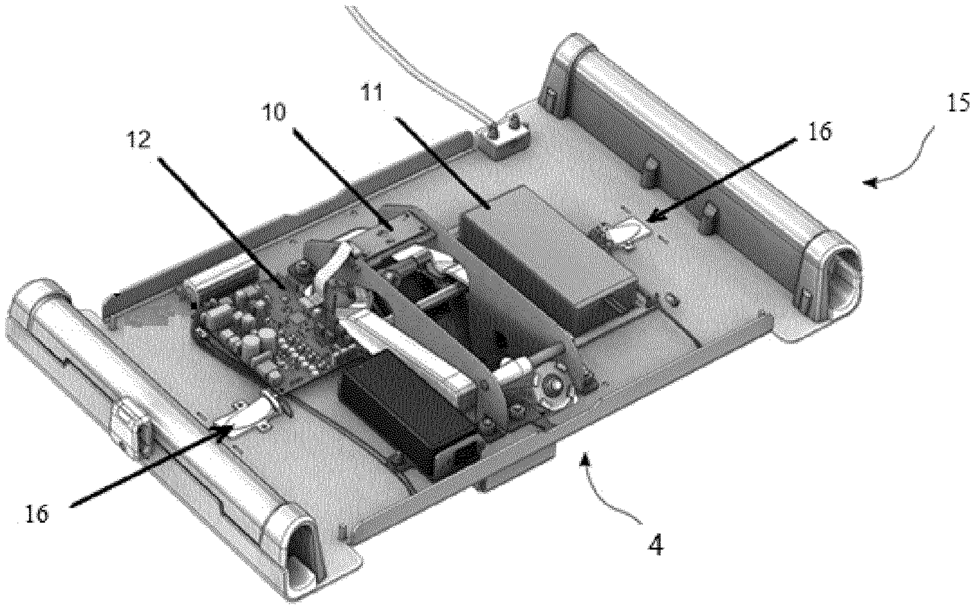
FIG. 7 is a perspective view of a portion of patient bed of FIG. 1 showing the status light indicator assembly mounted thereto.

Light beams 5 may be projected from one, two, three, four or more lighting units 16 of status indicator assembly 15. In the embodiment shown in FIG. 7, status indicator assembly 15 is shown to have two lighting units 16. The lighting units 16 and status indicator assembly 15 may be mounted adjacent to the propulsion system 4 on opposing lateral sides of a lower surface of the patient handling equipment and/or chassis 1 so as to face floor F. Alternatively, lighting units 16 and status indicator assembly 15 may be mounted to a lower surface of propulsion system 4 facing floor F. In one embodiment, as shown in FIGS. 1 and 3, lighting units 16, status indicator assembly 15, and more specifically light beam 5 emanating from lighting units 16, may either be aligned with or arranged parallel to an axis of drive wheel 3 when drive wheel 3 is lowered and engages floor F. A user may use the light as a reference point for guiding and maneuvering the patient handling equipment, e.g. such as to facilitate turning around corners or to provide a clearance reference with respect to obstructions or objects in the path of the patient handling equipment.

Figure 4:
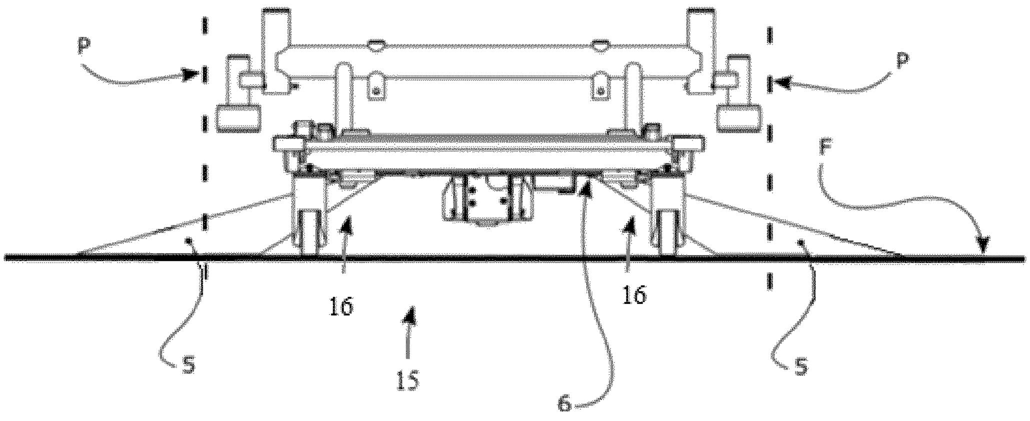
FIG. 4 is a front elevational view of the bed of FIG. 1.

Referring now to FIG. 4 the perimeter of the mobile patient handling equipment is indicated by the lines P, shown in this Figure from the perspective of one end of the chassis 1. The propulsion system 4 is disposed inside the perimeter P and the visible light user feed-back system 15 is arranged so as to project one or more, in this example two, light beams outside this perimeter P, specifically outside a lateral side of perimeter P. In the embodiment shown, light beams 5 are again as an ellipse 5 directed downwards and laterally outwards from a lower surface of the patient handling equipment onto the flooring F.

In one embodiment, the intensity of the projected light 5 may be determined and/or adjusted by taking into account the level of ambient light surrounding the patent handling equipment. For example, in a dark room it is not necessary for the light beam to be as intense as when the room is well lit. A photoconductive cell 6, disposed at or adjacent the propulsion system may be connected to the control system of the apparatus, which will in turn controls the intensity of the light source/light generated by the status indicator assembly 15 on the basis of the detected ambient light. In one system the photoconductive cell 6 may be disposed to as to "look down" onto the flooring F. This arrangement provides more efficient and effective adjustment of the intensity of the projected beam than, say, an arrangement which only detects ambient light in general. Moreover, the arrangement will automatically alter the intensity of the projected light beam for different floorings, for instance light or dark floorings.

In one embodiment, the light sensor 6 can be disposed to detect ambient light from other locations, including above floor level. Similarly, the light detector could be positioned elsewhere on the chassis 1 or the patient handling equipment and may be disposed adjacent the propulsion system 4 and/or may be contained in the propulsion system 4 to optimise cabling usage. It will be appreciated that given the orientation of the light sensor, this will provide optimal detection even when located adjacent the propulsion system 4 within the perimeter P of the chassis 1.

Figure 5:
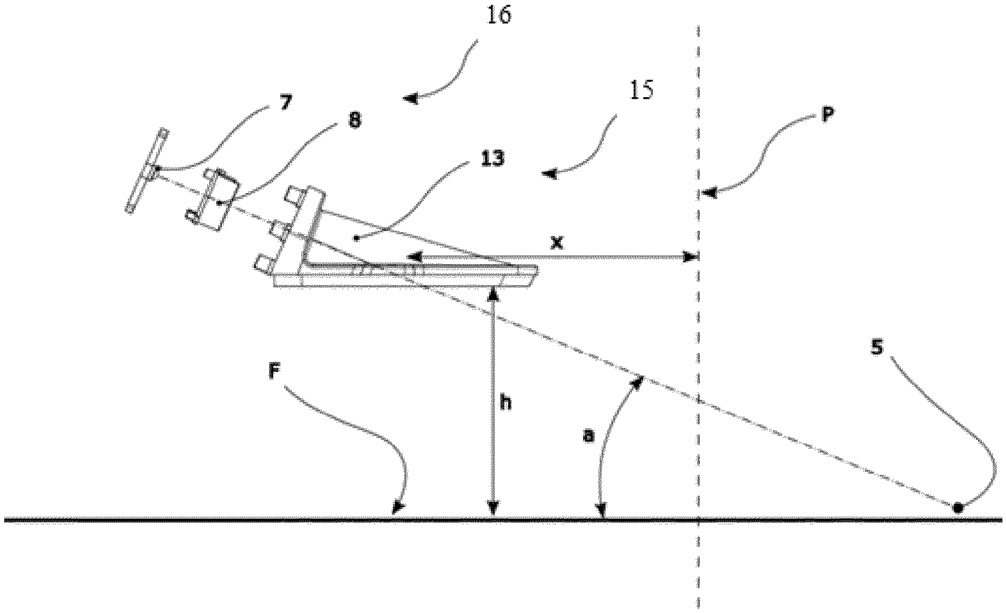
FIG. 5 is a side elevational view of a light projector of the system of FIGS. 1 to 4.

Referring now to FIG. 5, this is an exploded view of an exemplary embodiment of light unit or light source assembly 16. This includes a light source 7, such as an LED module, mounted optically behind a plano-convex lens 8 in a holder 13. In one embodiment, the assembly has as few components as feasible for sake of reliability and economy. The plano-convex lens 8 and the holder 13 can be formed as a single unit. The lens 8 can be configured as a double-convex lens or any other suitable arrangement to project light from the light source 7 onto the flooring at an intensity making it distinctively visible to the user.

The perimeter of the mobile patient handling equipment is indicated by the line P. The arrangement of the holder 13 is preferably such that the centre of the light beam 5 on the floor F projects on or outside the perimeter P. Referring to FIG. 5, this can be achieved by adjusting the angle "a" of the light beam in dependence upon the height "h" and distance "x" at which the light source is disposed. As an example, when the status indicator assembly 15 and lighting unit 16 are disposed at a height "h" of about 15 to about 18 cm and at a distance "x" from the perimeter P of between about 25 to about 40 cm, an optimal angle "a" is in the range of about 25 to about 30 degrees. It will be appreciated also that the angle "a" will be dependent upon the desired projection distance beyond the perimeter P.

Figure 6:
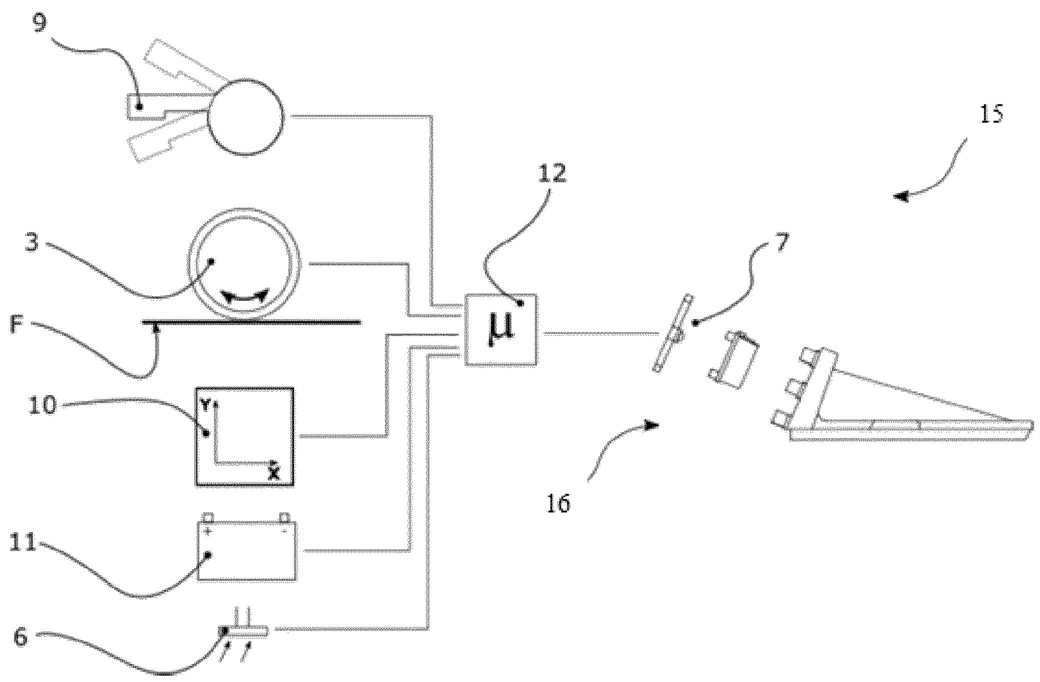
FIG. 6 is a schematic diagram of the status indicators of the exemplary embodiment of system taught herein.

Referring now to FIG. 6, the schematic diagram shows how a microprocessor 12 running a control program can be coupled to receive input signals from a variety of sources, such as the position (operating condition) of a user actuated pedal 9, the speed of a motor driven wheel 3 as it runs along a floor F, the acceleration of the equipment from an in the equipment placed accelerometer 10, ambient light intensity of the environment around the patient handling equipment detected by a light sensor 6, the condition of a battery source 11 used for powering amongst other things the motor driven wheel 3, and so on. The skilled person will be able to appreciate the nature of such input signals and how they can be typically processed by the microprocessor.

Microprocessor 12 can control one or more light sources 7. The skilled person will appreciate that different light sources have different controllable properties, with the common denominator of being controllable between on and off states as required. Some light sources, such as LEDs, can also be intensity controlled, that is adjusted from dim, or dark, to bright by a variety of mechanisms, including pulse width modulation. If several LED light sources are combined having different colours, mixing the intensity of the individual LEDs will render different colour light outputs, commonly referred to as RGB-LEDs. The light source could also be of other types, such as a halogen lamp or laser diodes, although LED lights are preferred due to their availability, cost and size.

The microprocessor 12 can with this arrangement, in one example, turn on the light source 7 when the user operates the pedal 9 to a position readying the motor driven wheel 3 to propel the patient handling equipment. By taking into account ambient light intensity detected by a light sensor 6, the microprocessor 12 can adjust the light intensity of the light source 7. In some embodiments, by taking into account the condition of the battery source 11, the microprocessor 12 can choose to output a continuous light or an intermittent light from the light source 7. In such a condition, and if desired also for other operational conditions, a continuous light can be indicative of everything being fully operational, whereas a blinking light can be indicative of a defect or error in the apparatus. In the example of the battery source 11, a blinking light will be indicative of the battery voltage dropping below a predetermined threshold.

The apparatus may also generate other output signals to the user, such as different colours to denote different parameters, such as green to indicate all is deemed to be fully functional and orange to indicate the need for the apparatus to be serviced. As systems are known in care facility settings which provide different coloured warning signals, in particular green, red, orange, yellow and white, the system taught herein can produces colour signals which are distinct from those in common use, such as blue and purple. In this example, a blue light may be used to signal that the equipment is being electrically powered. Different light patterns or light flashings can also be used to provide different indicators of the status of the propulsion system 4, brake status, and/or general device/system errors.

The microprocessor 12 may also, for example, control the light source 7 on the basis of the speed of movement of the equipment, determined for instance from the motor driven wheel 3. The intensity of the generated light may for example be set to be higher at standstill than when the equipment is moving above a certain speed, or vice versa.

The microprocessor 12 can also, for example, control the light source 7 on the basis of the acceleration of the equipment, determined for instance from the accelerometer 10, on whether or not patient is detected to be using the equipment, whether or not user is operating the equipment, and so on. In such cases, the light source 7 could be turned off after a period of time, or vice versa.

If the light source 7 is used with varying optics arrangements, such as the different projectable symbols 5*a*, 5*b*, 5*c*, the microprocessor 12 can be configured to choose which symbol 5 to illuminate and project, thereby to project different messages onto the floor. This may, in some embodiments, be by projecting different symbols in sequence in order to provide different status messages to the user.

While status indicator assembly 15 described above is discussed in the context of a patient handling system, the mention of a bed or trolley does not restrict the usage of the teachings herein to these platforms; others equipment that may be used together with the status indicator assembly 15 of the present disclosure may include, linen carts, food trolleys, mobile x-ray machines and similar equipment frequently used in a hospital or elderly care home environment.

All optional and preferred features and modifications of the described embodiments and dependent claims are usable in all aspects of the described system, devices, apparatus, and methods taught herein. Furthermore, the individual features of the dependent claims, as well as all optional and preferred features and modifications of the described embodiments are combinable and interchangeable with one another.

The invention claimed is:

1. A medical bed comprising:

a chassis;

a plurality of castor wheels coupled to the chassis;

a propulsion system for driving the medical bed, the propulsion system comprising at least one drive wheel configured to be raised to disengage from a floor on which the medical bed is positioned and lowered to engage the floor on which the medical bed is positioned; and a status light indicator device operatively associated with the propulsion system and generating light to provide an indicator as to a state of at least one of the propulsion system and a component thereof.

2. The medical bed according to claim 1, wherein the status light indicator device generates light to provide an indication as to a position of the at least one drive wheel of the medical bed.

3. The medical bed according to claim 1, wherein the status light indicator device generates at least one light beam directed downwardly and outwardly with respect to a lower surface of the medical bed and is visible irrespective of a viewer's position about the medical bed.

4. The medical bed according to claim 1, wherein the status light indicator device is disposed within a lateral perimeter of the medical bed and arranged to generate at least one light beam that extends downwardly and outwardly beyond the lateral perimeter.

5. The medical bed according to claim 1, wherein at least one light beam generated by the status light indicator device extends outwards about 2 inches to about 4 inches from a lateral perimeter of the medical bed.

6. The medical bed according to claim 1, wherein at least one light beam generated by the status light indicator device extends outwards at least about 2 inches from a lateral perimeter of the medical bed.

7. The medical bed according to claim 1, wherein the status light indicator device including at least two light projecting elements operable to generate at least two status light beams extending downwardly and outwardly beyond a perimeter of the medical bed and in different directions relative to one another.

8. The medical bed according to claim 7, wherein the at least two light projecting elements are operable to generate light beams in opposing directions relative to one another.

9. The medical bed according to claim 1, wherein the light generated by the status light indicator device extends laterally outwards beyond a side of the chassis parallel to an axis of the at least one drive wheel of the medical bed.

10. The medical bed according to claim 1, wherein the light generated by the status light indicator device extends laterally outwards beyond a side of the chassis and passes through an axis of the at least one drive wheel of the medical bed.

11. The medical bed according to claim 1, wherein the light generated by the status light indicator extends substantially perpendicularly relative to a lateral side of the chassis.

12. The medical bed according to claim 1, wherein the status light indicator device is operable to generate one or more light beams of different colors.

13. The medical bed according to claim 12, wherein the status light indicator device is operable to generate one or more blue or purple light beams.

14. The medical bed according to claim 1, wherein the status light indicator device is operable to generate one or more light beams of at least one of different shapes and different light patterns.

15. The medical bed according to claim 1, wherein the status light indicator device is operable to generate one or more light beams of different light patterns.

16. The medical bed according to claim 1, wherein the light generated by the status light indicator device is visible from a side of the chassis other than a side from which the light extends.

17. The medical bed according to claim 1, further comprising a control unit coupled to the status light indicator device and to one or more sensors.

18. The medical bed according to claim 17, wherein the control unit is coupled to a motor of the propulsion system and is operable to generate a status light command to the status light indicator device when the motor of the propulsion system is operational.

19. The medical bed according to claim 18, wherein the control unit is operable to generate a status light command dependent upon sensed motor speed.

20. The medical bed according to claim 17, wherein the control unit is coupled to the at least one drive wheel and is operable to generate a status light command to the status light indicator device when the at least one driven wheel is in an engaged position.

21. The medical bed according to claim 17, wherein the control unit is coupled to an accelerometer and is operable to generate a status light command to the status light indicator device when it is detected that the medical bed is moving or accelerating.

22. The medical bed according to claim 21, wherein the control unit is operable to generate a status light command differing in dependence upon detected medical bed speed.

23. The medical bed according to claim 17, wherein the control unit is coupled to a patient detection element and is operable to generate a status light command to the status light indicator device when it is detected that a patient is occupying the medical bed.

24. The medical bed according to claim 17, wherein the control unit is operable to generate a status light command to the status light indicator device indicative of at least one of: light status, light color, light intensity, and light beam shape.

25. The medical bed according to claim 17, further comprising an ambient light sensor, coupled to the control unit, the control unit being operable to adjust the operation of the status light indicator device based on ambient light detected by the ambient light sensor.

26. The medical bed according to claim 25, wherein the ambient light sensor is disposed to detect floor level light.

27. The medical bed according to claim 26, wherein the ambient light sensor is disposed to detect floor level light outside a lateral perimeter of the medical bed.

28. A medical bed comprising:

a chassis;

a plurality of castor wheels coupled to the chassis;

a propulsion system for driving the medical bed, the propulsion system comprising at least one drive wheel configured to be raised to disengage from a floor on which the medical bed is positioned and lowered to engage the floor on which the medical bed is positioned;

a brake pedal configured to apply a braking force to the plurality of castor wheels and in communication with the propulsion system; and a status light indicator device operatively associated with the propulsion system, wherein the status light indicator device is mounted to one of: a lower surface of the chassis adjacent to the propulsion system; a lower surface of the medical bed adjacent to the propulsion system; and directly mounted to the propulsion system, and wherein the drive wheel is raised when the brake pedal is positioned such that the braking force is applied to the plurality of castor wheels.

29. A medical bed comprising:

a chassis;

a plurality of castor wheels coupled to the chassis;

a propulsion system for driving the medical bed, the propulsion system comprising at least one drive wheel configured to be raised to disengage from a floor on which the medical bed is positioned and lowered to engage the floor on which the medical bed is positioned;

a foot pedal in communication with the propulsion system;

an ambient light sensor; and a status light indicator device operatively associated with the propulsion system and the ambient light sensor, wherein the status light indicator device adjusts an intensity of light generated by the status light indicator device based on detected ambient light intensity, and wherein the drive wheel is raised or lowered based on a position of the foot pedal.

* * * * *